United States Patent
Lively et al.

(10) Patent No.: US 10,614,411 B2
(45) Date of Patent: Apr. 7, 2020

(54) CROSS-DOCK MANAGEMENT SYSTEM, METHOD AND APPARATUS

(71) Applicant: Innovative Logistics, Inc., Fort Smith, AR (US)

(72) Inventors: Gary Shannon Lively, Fort Smith, AR (US); Mark Bradley, Fort Smith, AR (US); Patrick Sullivan, Fort Smith, AR (US)

(73) Assignee: INNOVATIVE LOGISTICS, INC., Fort Smith, AR (US)

( * ) Notice: Subject to any disclaimer, the term of this patent is extended or adjusted under 35 U.S.C. 154(b) by 346 days.

(21) Appl. No.: 15/623,702

(22) Filed: Jun. 15, 2017

(65) Prior Publication Data

US 2017/0286908 A1 Oct. 5, 2017

Related U.S. Application Data

(63) Continuation of application No. PCT/US2015/065775, filed on Dec. 15, 2015, which is a continuation of application No. 14/968,144, filed on Dec. 14, 2015, now Pat. No. 9,367,827.

(60) Provisional application No. 62/091,718, filed on Dec. 15, 2014.

(51) Int. Cl.
 *G06F 7/00* (2006.01)
 *G06Q 10/08* (2012.01)
(52) U.S. Cl.
 CPC .............. *G06Q 10/08355* (2013.01)
(58) Field of Classification Search
 None
 See application file for complete search history.

(56) References Cited

U.S. PATENT DOCUMENTS

| | | | |
|---|---|---|---|
| 2,678,139 A | 5/1954 | Gildersleeve | |
| 3,667,635 A | 6/1972 | Hackney | |
| 3,880,299 A * | 4/1975 | Zollinger | B65G 1/0414 414/273 |
| 3,938,678 A | 2/1976 | Kern | |

(Continued)

FOREIGN PATENT DOCUMENTS

| | | |
|---|---|---|
| CA | 2144886 | 9/1996 |
| CN | 203520452 U | 4/2014 |

(Continued)

OTHER PUBLICATIONS

Communication Pursuant to Article 94(3) EPC dated Mar. 21, 2019, from European Patent Application No. 15 870 857.8, 7 sheets.

(Continued)

*Primary Examiner* — Yolanda R Cumbess
(74) *Attorney, Agent, or Firm* — Katten Muchin Rosenman LLP

(57) ABSTRACT

Disclosed herein is a cross-dock management system comprises: a plurality of movable platforms configured to hold one or more pallets or parcels; at least one barcode or RFID tag positioned on each of said movable platforms, pallets, or parcels, wherein the barcode readers are configured to read the barcodes and RFID readers are configured to read the RFID tags. The data scanned by the barcode readers and RFID readers is stored in a local warehouse database and is used to determine an optimized placement and load for each movable platform in the warehouse.

18 Claims, 8 Drawing Sheets

(56) References Cited

U.S. PATENT DOCUMENTS

| | | | |
|---|---|---|---|
| 4,231,695 | A | 11/1980 | Weston, Sr. |
| 5,011,358 | A | 4/1991 | Anderson et al. |
| 5,454,672 | A | 10/1995 | Halpin et al. |
| 5,799,585 | A | 9/1998 | Brennan, Jr. et al. |
| 6,529,797 | B2 | 3/2003 | Williams et al. |
| 6,575,686 | B2 | 6/2003 | Hagenzieker |
| 6,669,089 | B2 | 12/2003 | Cybulski et al. |
| 6,698,655 | B2 | 3/2004 | Kondo et al. |
| 7,030,760 | B1 | 4/2006 | Brown |
| 7,101,139 | B1 | 9/2006 | Benedict |
| 7,327,262 | B2 | 2/2008 | Motteram et al. |
| 7,603,299 | B1 | 10/2009 | Dewey, Jr. et al. |
| 7,739,147 | B2 | 6/2010 | Branigan et al. |
| 7,742,745 | B2 | 6/2010 | Twitchell, Jr. |
| 7,826,920 | B2 | 11/2010 | Stevens et al. |
| 7,991,505 | B2 | 8/2011 | Lert, Jr. et al. |
| 8,442,879 | B2 | 5/2013 | Dewey, Jr. et al. |
| 8,491,240 | B2 | 7/2013 | Baker |
| 8,626,540 | B2 | 1/2014 | Peterkofsky et al. |
| 8,731,708 | B2 | 5/2014 | Shakes et al. |
| 8,734,078 | B2 * | 5/2014 | Benedict ............... E04H 6/225 414/239 |
| 8,744,884 | B2 | 6/2014 | Benda et al. |
| 8,972,045 | B1 | 3/2015 | Mountz et al. |
| 9,367,827 | B1 | 6/2016 | Lively et al. |
| 10,147,059 | B2 | 12/2018 | Sullivan et al. |
| 2003/0050819 | A1 | 3/2003 | Koenigbauer et al. |
| 2005/0071234 | A1 | 3/2005 | Schon |
| 2005/0125247 | A1 | 6/2005 | Ding |
| 2006/0015532 | A1 | 1/2006 | Mizell |
| 2007/0136079 | A1 | 6/2007 | Beykirch et al. |
| 2007/0156491 | A1 | 7/2007 | Schuler et al. |
| 2007/0174148 | A1 | 7/2007 | Schuler et al. |
| 2007/0279224 | A1 | 12/2007 | Branigan et al. |
| 2008/0103944 | A1 | 5/2008 | Hagemann et al. |
| 2008/0167817 | A1 | 7/2008 | Hessler et al. |
| 2009/0267770 | A1 | 10/2009 | Twitchell, Jr. |
| 2009/0293756 | A1 | 12/2009 | Hathaway |
| 2010/0108760 | A1 | 5/2010 | Eccleston |
| 2010/0183409 | A1 * | 7/2010 | Checketts ............ G05D 1/0297 414/231 |
| 2010/0241532 | A1 | 9/2010 | Biddle |
| 2011/0274523 | A1 | 10/2011 | Petalas |
| 2012/0101956 | A1 | 4/2012 | Hyre et al. |
| 2012/0112904 | A1 | 5/2012 | Nagy |
| 2012/0191272 | A1 | 7/2012 | Anderson et al. |
| 2012/0239224 | A1 | 9/2012 | McCabe |
| 2013/0183124 | A1 * | 7/2013 | Wastel ...................... E04H 6/22 414/261 |
| 2014/0277691 | A1 | 9/2014 | Jacobus et al. |

FOREIGN PATENT DOCUMENTS

| | | |
|---|---|---|
| DE | 2951271 | 7/1981 |
| EP | 2 845 823 | 3/2015 |
| JP | H07-069458 A | 3/1995 |
| KR | 2014-0101117 A | 8/2014 |

OTHER PUBLICATIONS

International Search Report and Written Opinion dated Jan. 2, 2018, from the corresponding International Application No. PCT/US2017/059080, 14 sheets.

Extended European search report dated Apr. 23, 2018, for European Patent Application No. 15870857.8, 6 sheets.

Notice of Allowance dated Apr. 18, 2018, from U.S. Appl. No. 15/798,729.

Notice of Allowance dated May 3, 2018, from U.S. Appl. No. 15/798,729.

Office Action dated Dec. 10, 2018, from U.S. Appl. No. 16/169,523, 19 sheets.

Notice of Allowance dated Jul. 30, 2018, from U.S. Appl. No. 15/798,729.

H&M Bay Deploys RFID solution at cross-docketing distribution center, RFID24-7Com, Mar. 30, 2010.

3PL Adds Customer Value with RFID, Sato Eueope, Megatrux, Inc., Rancho Cucamonga, California.

"Maida Napolitano", Contributing editor, Crossdocking: The latest and greatest, Article from Logistics Management, MMH Editorial, Apr. 1, 2010.

K. Choy, et. al., Cross-dock job assignment problem in space-constrained industrial logistics distribution hubs with a single docking zone, Taylor & Francis Online, International Journal of Production Research, vol. 50, Issue 9, 2012, Special Issue: International logistics systems: theory and applications.

G. Miragliotta, et. al., A quantitative model for the introduction of RFId in the fast moving consumer goods supply chain: Are there any profits?, International Journal of Operations & Production Management, ISSN: 0144-3577, Online from 1980, Subject Area: Management Science & Operations.

J Wang, et. al., Real-time trailer scheduling for crossdock operations, Transportation Journal 47.2, (Apr. 2008-Jun. 2008): 5(16).

Transmittal; International Search Report; and the Written Opinion of the International Searching Authority for Internatinonal Application No. PCT/US2015/065775 dated Mar. 30, 2016.

Office Action dated Jul. 22, 2019, from U.S. Appl. No. 16/435,997, 5 sheets.

* cited by examiner

CROSS-DOCK MANAGEMENT SYSTEM, METHOD AND APPARATUS

This application is a continuation of PCT/US2015/065775, filed Dec. 15, 2015 which is a continuation of U.S. patent appln. Ser. No. 14/968,144 now U.S. Pat. No. 9,367,827, issued Jun. 14, 2016 which is a non-provisional of U.S. Patent Appln. No. 62/091,718, filed Dec. 15, 2014 the contents of all incorporated herein by reference.

TECHNICAL FIELD

The present invention relates to the field of freight, shipping, and dock management; more particularly, to an optimized cross-dock management system, method, and/or apparatus; even more particularly, to an optimized cross-dock management system, method, and/or apparatus for use with less-than-truckload carriers.

BACKGROUND

Within the shipping industry exists a segment of transportation that focuses on less-than-truckload (LTL) freight loads, which can vary from a single item to a nearly full truckload. To transport freight originating from a common origin destined for multiple locations around the country or region, LTL carriers often employ a hub-and-spoke network of terminals.

Once freight is picked up, it is brought back to a facility where it is transferred across a dock (a process commonly referred to as "cross-docking"). This process typically involves unloading the load (or portion thereof) from one trailer and loading it onto another. Freight can move through terminals in a hub-and-spoke network until the freight reaches its destination terminal and is delivered. In a hub-and-spoke network, small local terminals are the spokes (often at the end of line), while larger, more central terminals function as the hubs (also called distribution centers).

Due to the complexity of the hub-and-spoke network, transit times for LTL freight are generally longer than those for full truckload (FTL) freight, which typically navigate directly from an origin to a destination without intervening terminals. Indeed, LTL transit times are not directly related only to the distance between shipper (origin) and consignee (destination), rather, LTL transit times are dependent upon the makeup of the network of terminals (and distribution centers) that are operated by a given carrier, and that carrier's beyond agents and interline partners. Further, there is a significant amount of capital involved, particularly for the large distribution centers, to be able to support a nationwide network of terminals. In addition, multiple carriers exist with their own network of terminals, which are often located in the same geographical area as another carrier, oftentimes next door to one other. Independent networks that do not have economies of scale (large shipment volumes) can be inefficient and cannot provide the level of service that the market requires. For example, individual networks typically average 10-20% of unused capacity within a scheduled network designed to meet service requirements. Despite the complexities thrust upon LTL carriers, the LTL market continues to demand not only faster service, but a precision service with lower costs. With the market demand for faster service continuing to grow, it can be increasingly more difficult and capital intensive for carriers without economies of scale to compete in the LTL marketplace. What are needed are a more efficient and economical system, method, and apparatus to facilitate LTL operations. Thus, described herein is an optimized cross-dock management system, method, and/or apparatus for use with, inter alia, less-than-truckload carriers.

SUMMARY OF THE INVENTION

The present invention is directed to an optimized cross-dock management system, method, and/or apparatus for use with, inter alia, less-than-truckload carriers.

According to one aspect, a cross-dock management system comprises: a plurality of movable platforms configured to hold one or more pallets or parcels; at least one barcode or RFID tag positioned on each of said movable platforms, pallets, or parcels, wherein the barcode readers are configured to read the barcodes and RFID readers are configured to read the RFID tags. The data scanned by the barcode readers and RFID readers is stored in a local warehouse database and is used to determine an optimized placement and load for each movable platform in the warehouse.

DESCRIPTION OF THE DRAWINGS

These and other advantages of the present invention will be readily understood with the reference to the following specifications and attached drawings wherein.

DETAILED DESCRIPTION

Preferred embodiments of the present invention will be described hereinbelow with reference to the accompanying drawings. In the following description, well-known functions or constructions are not described in detail because they may obscure the invention in unnecessary detail. While the present invention is generally directed to LTL operations for use in the trucking industry, the teachings may be applied to other shipping industries, just as those by air, sea, and rail. Therefore, the teachings should not be constructed as being limited to only the trucking industry. For this disclosure, the following terms and definitions shall apply:

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As noted above, LTL carriers typically transport freight originating from a common origin destined to many different locations around the country via a system of terminals. Typically, once freight is picked up, the freight is brought back to a facility where it is transferred across a dock (cross-docked), which involves unloading the freight from one trailer and loading it onto another. Freight can move through one or more terminals (e.g., small terminals or distribution centers) in a hub-and-spoke network until the freight reaches its destination terminal and/or is delivered.

Figure 1:
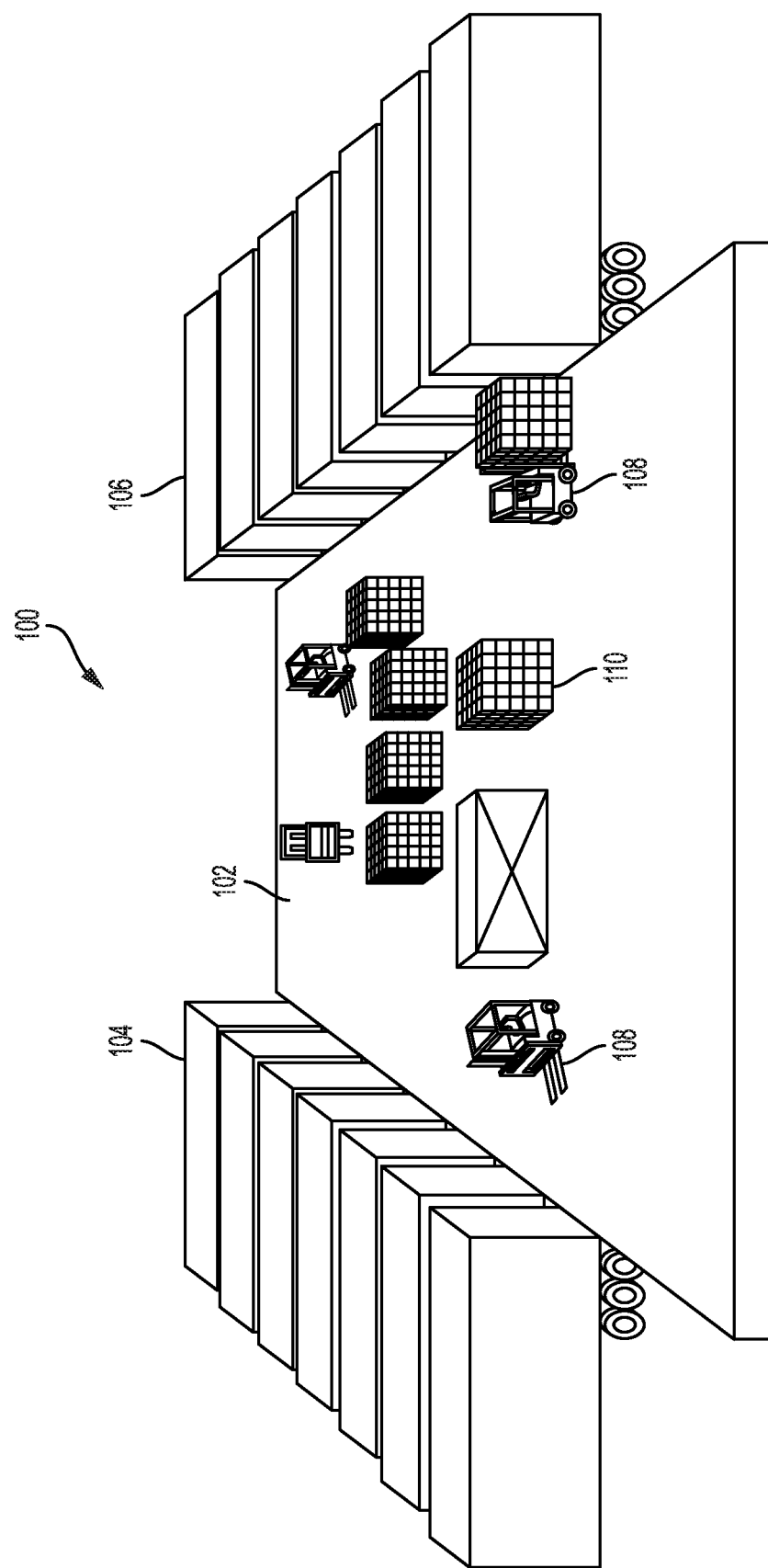
FIG. 1 depicts a perspective view of a typical dock currently used by LTL carriers.

Referring first to FIG. 1, depicted is a typical terminal 100 used by current LTL carriers. As shown, dock 102 is long and narrow. Typically, dock 102 is 60 feet in width or less. An inbound door 104 of dock 102 is used for unloading trailers and a second door 106 is used for loading trailers. Unloading is generally sequenced in a last in, first out (LIFO) process. Thus, pallets or parcels in the nose (front) of the trailer that need to be unloaded must first have the entire trailer unloaded to provide access to the desired freight. As a worker cross-docks freight from the inbound door 104 to the outbound door 106, half of the time is typically spent without any load, which wastes both time and money. Further, at least one load door is required for every load point, but multiple doors may be necessary for multiple schedules to the same load point. Since loading is generally sequenced from the nose to the rear, freight 110 is typically docked in a bay outside the door to allow for co-mingling of the freight on the trailer for the optimum load. This practice creates congestion, wasteful re-handling time, and additional cost. Also, because dock 102 is long and narrow, the maneuverability of workers 108 is severely limited, especially when there is a large quantity of freight 110 on dock 102.

Figure 2:
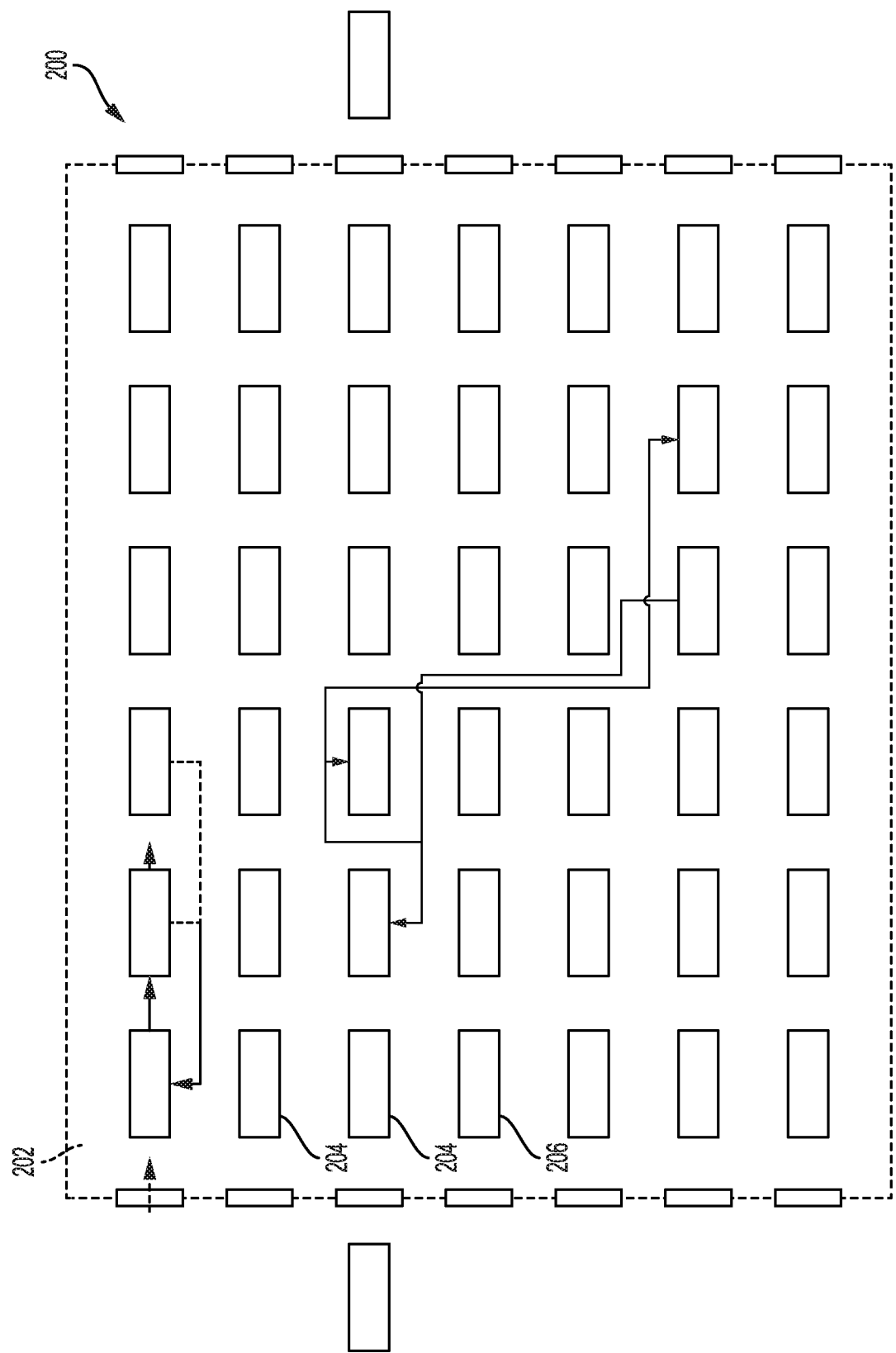
FIG. 2 depicts an optimized dock according to a first aspect of the present invention.

An optimized cross-dock management system 200 in accordance with an aspect of the present invention transforms the process for moving LTL freight across the dock 202 by adding a novel combination of mechanics, technology, and automation as depicted in FIG. 2. To facilitate the optimized cross-dock management system 200, an optimized dock 202 may be employed that is two to three times wider and two to three times shorter than a traditional dock; thus, an optimized dock 202 may more closely resemble a square. Designed properly, an optimized dock 202 may require one-third the number of doors as dock 102 without sacrificing capacity. Alternatively, the optimized dock can 202 be wide enough such that a predetermined number (e.g., 2 to 10, more preferably 3 to 9, most preferably, 5 to 7) of movable platforms 204 can be spaced out per dock door. The distance between dock doors may be, for example, 12 feet or more. When a movable platform 204 is removed from a trailer it can be conveyed onto the dock 202.

Further, the use of movable platforms 204 allows for an entire trailer to be unloaded or loaded in less than five minutes, thus increasing efficiency and saving money. Movable platforms 204 may be used to provide optimized load building and planning via real-time data and sensing technology, such as barcodes (2D or 3D), radio-frequency identification (RFID) tags, three dimensional (3D) imaging, and global positioning system (GPS) tracking. Preferably, the movable platform 204 has a height of 4" or less.

The movable platform 204 may have removable side panels, walls, or other retraining materials, such as ropes, nets, and/or rods that contain, or otherwise restrain, loose pallets or shipment parcels placed thereon. When an enclosed movable platform 204 is employed (e.g., when walls, panels, or the like are used), the movable platform's shape 204 is preferably a cube or a rectangular prism, but other shapes are anticipated to meet a specific need or trailer shape, such as a triangular prism or cylinder. A roof panel may also be employed with an enclosed movable platform 204, but is not required. To facilitate movement, the movable platform 204 may employ a plurality of wheels, castors, or the like. To facilitate use with a forklift, the movable platform 204 may comprise cut outs (e.g., a rectangular notch), at the base of each side of the platform, that are configured to receive fork lift prongs from any directions. In certain aspects, the movable platform may even be powered (e.g., motorized). In certain aspects, for example, when an open air trailer is used, the movable platform 204 may be vertically removed from the trailer using, for example, a crane or other hoisting apparatus.

As already stated, in some embodiments, the workers may use forklifts to move the movable platforms 204 about dock 202. However, an automated guided vehicle (AGV), such as an automated forklift, may also be utilized. Instructions from instruction database 410 can be provided directly to the AGV and the movement of the AGV about dock 202 may be performed by following markers on (or wires in) the floor, or by other navigation sensor-based means, such as vision, magnets, lasers, GPS, infrared sensors, RFID array 316, or any other known means.

Preferably, the plurality of movable platforms 204 are the size of the bed of a typical pup trailer (e.g., 28' in length, 100" wide, 100" tall). This allows an entire trailer to be unloaded at once by simply removing movable platform 204 from the trailer. After the movable platform 204 has been removed from a trailer, it is conveyed to an assigned space 206 as will be described later. As depicted in FIG. 2, the spaces 206 are arranged in a grid pattern which provides several advantages. First, because an entire trailer can be unloaded quickly, the trailer can quickly be removed from the unloading door. Thus, many less unloading and loading doors are needed for cross-dock management system 200. Also, movable platforms 204 which contain many parcels or pallets that must be exchanged can be placed in spaces 206 next to each other which reduces the movement required of each worker. And, each movable platform 204 can be accessed from all four sides which provides many more routes which reduces congestion (by providing more moving paths) and also allows multiple workers to work on the same movable platform 204 for simultaneous unloading and loading. Movable platform 204 also makes irregular freight easier to deal with since it can be loaded onto the movable platform on dock 202 where there is much more room to maneuver than in the trailer. The worker also does not have to drive a forklift in and out of a trailer constantly, which is a significant bottleneck in cross-dock operations. These and other advantages of cross-dock management system 200 will become apparent as the system is further described.

Figure 3:
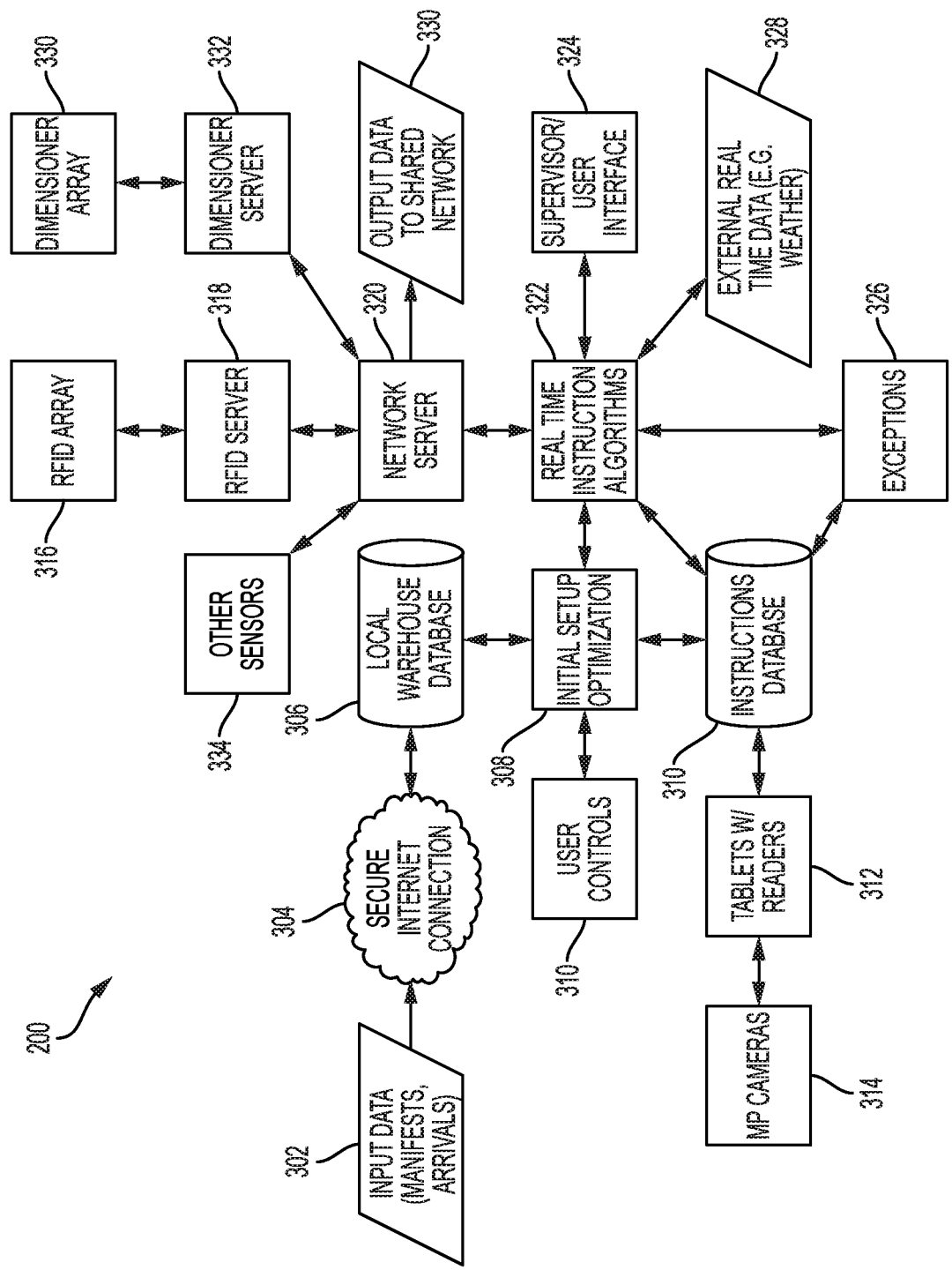
FIG. 3 depicts a system diagram showing the hardware and resources employed during operation of the optimized dock of FIG. 2.

FIG. 3 depicts a system diagram showing the hardware and resources employed by cross-dock management system 200 used to optimize unloading and loading of trailers and movement of parcels and pallets on dock 202. First, input data 302 (e.g., manifests, arrivals) arrives at cross-dock management system 200 via a secure internet connection 304. Input data 302 provides cross-dock management system 302 with the initial information needed to optimize the loading and unloading of trailers as well as the conveyance of movable platforms 204 across dock 202.

The received input data 302 is stored in a local warehouse database 306 so that it can utilized initial setup optimization 308 which determines optimal instructions for the unloading and loading of movable platforms 204. Specifically, the initial setup optimization 308 is a series of algorithms that utilizes the input data 302 to determine optimal instructions which minimizes loading and unloading time; minimizes movable platform, pallet, and parcel movement time; reduces empty carries and moves by workers; reduces travel distance; and optimizes the number of workers required based upon the number of moves. Any of the instructions can manually be overridden by a supervisor or other worker by utilizing worker controls 310.

Once the instructions are determined, they are stored in instructions database 310. The instructions specify where each movable platform 204 is to be placed and what specific parcels or pallets need to be moved to/from each movable platform 204. The instructions are provided to each worker on a tablet 312 wirelessly connected to the instructions database 310. Tablet 312 may be any device having a display that is capable of receiving instructions from instruction database 310. In a preferred embodiment, tablet 312 is a portable communications device with a touch screen and one or means for user input such as a keyboard, barcode reader, RFID reader, etc.

The instructions sent to tablet 312 may also provide a moving path (directions) to the worker and an exact destination on a movable platform 204 to which the pallet or parcel is to be moved. In some embodiments, the instruction may cause the tablet 312 to display additional information including shipment origin, destination, weight, dimensions, departure time, due date, unload assignment movable platform dock location and shipment parcel location within the movable platform 204, and load assignment movable platform dock location and shipment parcel location.

As each instruction (i.e., move) is performed by a worker, a reader (RFID or barcode) attached to the tablet 312 may be used to verify each move. For example, before a move is completed, a worker first scans the barcode on a parcel and scans the barcode on the movable platform 204. Then, the worker conveys the parcel to its destination and scans the destination movable platform 204 and parcel to verify that the move has been completed. The worker is then supplied with the next instruction, preferably, based upon the current location of the worker on dock 202 in order to reduce the distance that the worker needs to travel to complete the next instruction. The same process can also be completed using RFID tags in addition to, or substitution of, the barcodes.

In some embodiments, each movable platform 204 is equipped with a wireless digital camera 314 at a front end (i.e., opposite from the worker). The wireless digital camera 314 can connect to any tablet 312 by a suitable wireless connection such as WiFi or Bluetooth. The wireless digital camera 314 allows a worker to safely maneuver a movable platform 204 in and out of trailers and across dock 202. The wireless digital camera 314 may be provided with a light source to help the worker during the loading or unloading process.

Additional technologies including, but not limited to, temperature and vibration sensors, light sensors to determine if the trailer door is opened and a GPS device for tracking may also be equipped on the movable platform 204.

As parcels and movable platforms 204 are being moved around dock 202, it is important to keep track of the location of each parcel so it does not end up at the wrong final destination. Equipping each worker with a tablet 312 helps to ensure that each instruction is carried out properly. However, a worker may still move a parcel without scanning it properly. Thus, the cross-dock management system 200 may utilize other sensors as a backup to tablets 312. Such systems also help if an automated system is deployed instead of or in addition to workers. A first example of such a system that may be employed by cross-dock management system is RFID array 316 which preferably comprises a plurality of RFID readers arranged in a grid on dock 202. Each of the RFID readers in RFID array 316 is connected to an RFID server 318 which is capable of real-time tracking of each movable platform 204, parcel, pallet, and worker located on dock 202. The tracking information from RFID server 318 is periodically or constantly provided to a network server 320 which can be used by real time instruction algorithms 322 to verify that each instruction has been carried out properly. If the real time instruction algorithms 322 detect that any instructions have been carried out improperly or that a parcel, pallet, or movable platform 204 has been moved to an incorrect location, the instructions database 310 can be corrected in real time to correct any errors.

The RFID tags used in combination with the present invention can store date indicative of, for example, shipment origin, destination, weight, cube, dimensions, number of shipment parcels, due date, etc. or may simply indicate a tracking number. The RFID tag and any associated RFID reader may be configured to work using one or more RFID technologies, including, without limitation: (1) a Passive Reader Active Tag (PRAT) system; (2) an Active Reader Passive Tag (ARPT) system has an active reader, which transmits interrogator signals and also receives authentication replies from passive tags; and (3) an Active Reader Active Tag (ARAT) system uses active tags awakened with an interrogator signal from the active reader. A PRAT system has a passive reader that only receives radio signals from active tags (e.g., battery operated, transmit only). The reception range of a PRAT system reader can be adjusted from 1-2,000 feet, allowing flexibility in applications such as asset protection and supervision. A variation of the ARAT system could also use a Battery-Assisted Passive (BAP) tag which operates like a passive tag, but has a small battery to power the tag's return reporting signal. For example, passive ultra high frequency (UHF) RFID tags may be used to identify, locate and track items within the dock and/or yard. Suitable UHF RFID tags, and associated RFID readers, are available from RF Controls of St. Louis, Mo. While RFID is generally described herein, other technologies may be used in addition to, or in lieu of, RFID to facilitate tracking of the movable platforms and/or shipment parcel(s), such as near field communication ("NFC").

The real time instruction algorithms 322 are able to handle any exceptions or other problems that may occur in real time. For example, the real time instruction algorithms are provided with a supervisor or worker interface 324 which allows a supervisor to prioritize certain movable platforms 204, parcels, or shipments. For example, if a supervisor receives a telephone call or communication indicating that a certain parcel has been prioritized or must reach a new and different final destination, the supervisor can use worker interface 324 to provide this information to cross-dock management system 200. The real time instruction algorithms 322 then computes an exception 326 which is stored instructions database 310. In this manner, the workflow of workers on dock 202 is not interrupted. The workers are simply provided new and/or updated instructions at their tablets 312 to carry out.

Real time instruction algorithms 322 can also receive input from external real time data 328 such as weather, trailer delays, etc. For example, another terminal 100 may inform the cross-dock management system 200 of trailer delays or breakdowns. In another example, the real time instruction algorithms 322 may be notified of external real time data 328 including weather events or road closures which will affect either inbound and/or outbound trailers.

Cross-dock management system 200 may also output data 330 to a shared network to other terminals 100. In this manner, all of the cross-dock management systems 200 among the various terminals 100 are linked together. The sharing of data 330 has many benefits. For example, if a certain geographical region has been hit by a natural disaster, movable platforms 204 can be rerouted to different terminals 100 to circumnavigate the area affected by the natural disaster. Thus, having multiple terminals 100 that are geographically distributed can be turned into an advantage by allowing the rerouting of trailers in real time. In some embodiments, new destination instructions can be communicated to mobile trailers via a wireless communication interface such as cellular phone, radio, etc.

The pallets and parcels carried on each movable platform 204 are constrained by the trailer that they must fit into. For example, most pup trailers are not allowed to convey more than 24000 pounds. And, the width, length, and height are constraints that the pallets and parcels cannot exceed. Input data 302 generally contains the weight of each pallet or parcel. However, in LTL shipping, the dimensions of shipments can vary greatly (e.g., long and narrow or cylindrical). Therefore, the cross-dock management system 200 may also employ a dimensioner array 330 which monitors the dimensions of each movable platform 204 to ensure that it does not exceed the interior size of the trailer. Each space 206 on the dock may be provided with its own dimensioner or one dimensioner may cover multiple spaces 206. Preferably, a dimensioner is an imaging device capable of monitoring the boundaries of the movable platform 204 as well as the height of the pallets and parcels placed upon the movable platform 204. The information from the dimensioner array 330 is collected and stored by dimensioner server 332.

The information collected by dimensioner server 332 may be utilized by the real time instruction algorithms 322 if it is detected that a particular movable platform has exceeded acceptable constraints to length, width, and height. If any excesses is detected, the real time instruction algorithms 322 provide new instructions to instructions database 310. Also, the dimensioner server 332 can be used to detect where irregular shaped cargo can be placed. For example, certain LTL shipments, such as ladders, could be placed on top of a movable platform 204 as long as the resulting load does not exceed a predetermined height requirement.

Other sensors 334 may also be utilized to monitor movable platforms 204. For example, each space 206 may be provided with a scale or other weight measuring device to ensure that the movable platform 204 does not exceed a certain weight limit. The weight sensors may even be pressure sensitive to determine if the load on each movable platform is distributed equally or logically (e.g., to place more weight on the end of movable platform 204 to prevent possible sag in the middle). The real time instruction algorithms 322 can use the data from other sensors 334 to make any necessary corrections to instructions database 310. It should be apparent to one of ordinary skill in the art that sensors may be added or deleted from cross-dock management system at any time simply by installing or removing the sensors and adapting the real time instruction algorithms 322 properly.

For illustration purposes, the steps utilized to unload and load a trailer will be described in detail using the flowchart of FIG. 4 referencing the dock shown in FIG. 2 and the various components of cross-dock management system 200 shown in FIG. 3. First, an inbound trailer containing a new movable platform 204 arrives at the terminal 100 in step 402. The trailer is then directed to a particular door in step 404 using instructions retrieved from instructions database 310. The movable platform 204 is then unloaded from the trailer in step 406 and scanned by a worker using tablet 312. Also, at this point, the RFID array 316 will have scanned any RFID tags contained on the movable platform 204 since it is now located on dock 202.

Using the instructions provided by instructions database 310, the movable platform 204 is then conveyed into its optimized space 206 on dock 202 in step 408. The worker verifies that the movable platform has been properly moved by scanning a barcode associated with the optimized space 206 along with a barcode associated with the movable platform 204 in step 410. Alternatively, or in addition, the RFID array 316 or other sensors 334 may also be utilized to verify that the movable platform 204 is in the optimized space 206.

The workers then begin receiving assignments from the instruction database 310 in step 412. For example, the instructions may be presented one at a time on tablet 312 (optimized) or the worker may select from a list of provided instructions (worker choice). The workers then carry out all of the instructions for the movable platform cargo in step 414. Before the movable platform is conveyed to a trailer, a supervisor preferably inspects the loaded movable platform 204 in step 416. For example, the supervisor may check to see if any packages have been damaged or if the parcels and pallets are all secured correctly to the movable platform 204.

Using instructions retrieved from instructions database 310, a worker conveys movable platform to a particular door to a waiting, empty trailer in step 418. It should be noted that since a movable platform 204 can be quickly unloaded and unloaded, the empty trailer does not have to wait at dock 202 and instead can wait somewhere in a yard. Then, when the movable platform 204 is ready to be loaded (e.g., after step 416), the correct trailer in the yard can be notified and assigned a door to drive to for loading. Thus, it should be apparent that this provides a significant advantage over traditional LTL methods at which trailers generally have to stay at the door for long periods while they are unloaded or loaded. The cross-dock management system of the present invention only requires the presence of trailers at doors if a movable platform is being unloaded or loaded.

Using a tablet 312, a worker scans the barcode associated with the movable platform 204 along with a barcode associated with the trailer at the door to associate them together in step 420. The RFID array 316 can also be used for similar purposes.

The movable platform 204 can then be loaded onto the trailer in step 422. The worker can wirelessly connect a tablet 312 to the wireless digital camera 314 located on each movable platform 204. This enables the trailer to be loaded more easily since the movable platform 204 is long and stacked with parcels and pallets.

Figure 4:
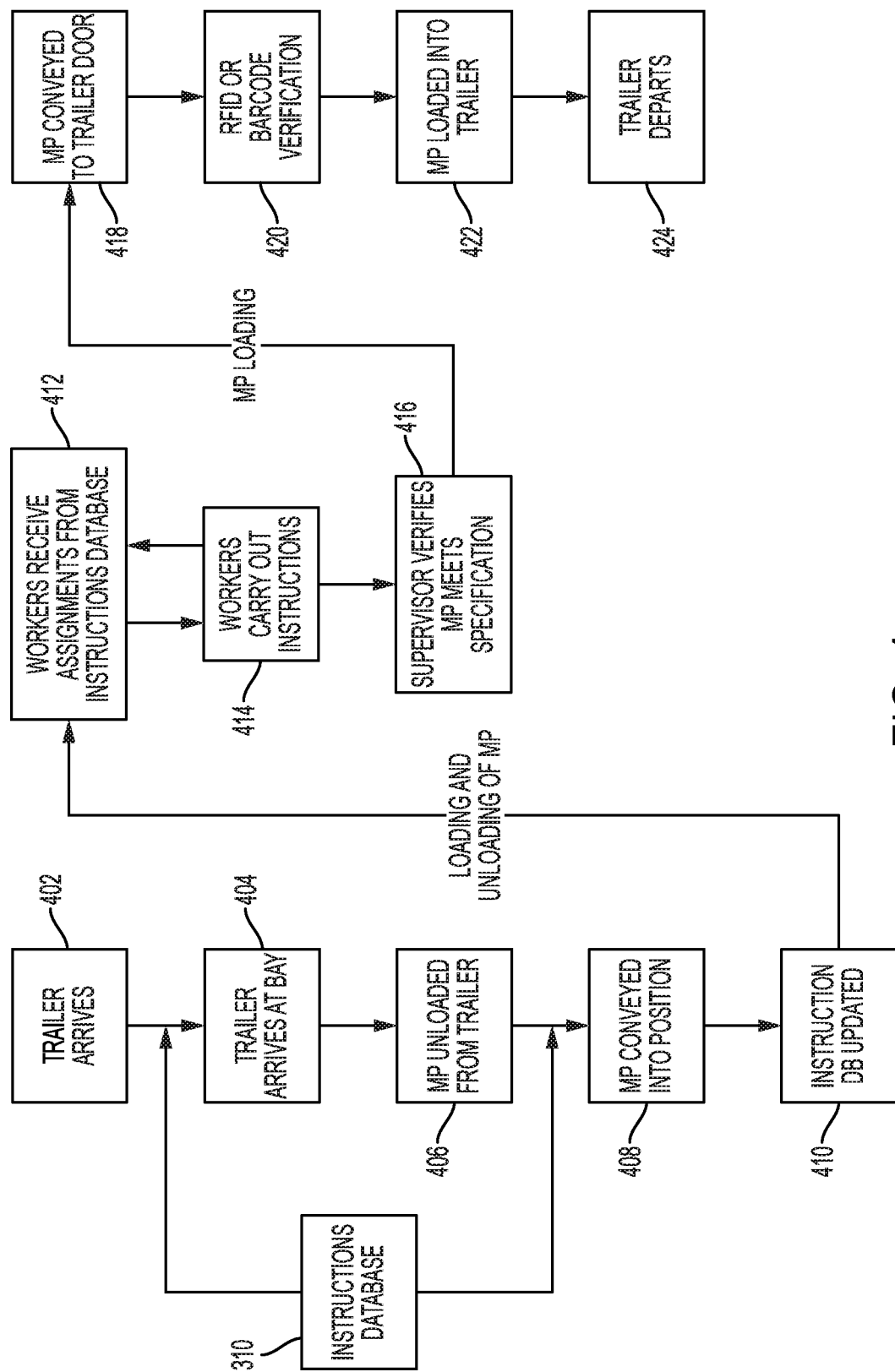
FIG. 4 depicts a flowchart showing the steps used in unloading and loading a movable platform.

The process depicted in FIG. 4 can also be performed by an AGV. A process for moving freight using an au AGV would be substantially the same, except that the information displayed on the tablets 312 would be communicated to the AGV's processor, thereby enabling the automated loading device to automatically locate the shipment parcel to be loaded (or unloaded) via RFID or other means. The AGV may also be able to navigate to (and/or relocate) a specified movable platform 204 upon receipt of the specified movable platforms position (e.g., location) within the dock 202.

Figure 5:
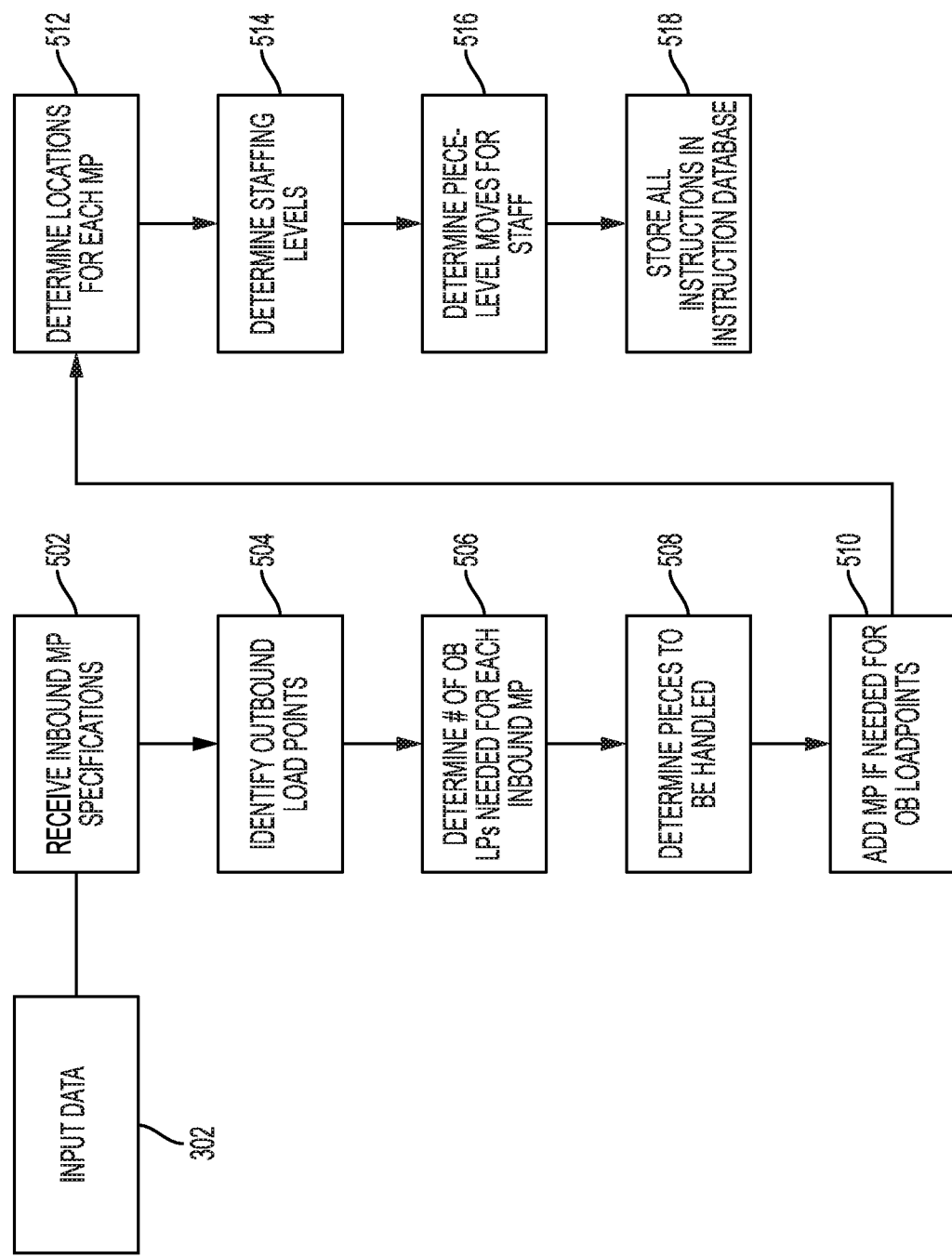
FIG. 5 depicts a flowchart showing the steps used to determine movement instructions for the movement database using input data.

FIG. 5 depicts a flowchart showing the steps utilized by initial setup optimization 308 to calculate instructions from input data 302. First, in step 502, the input data 302 is received and stored in local warehouse database 306. Based on the received manifests in input data 302, all outbound load points are identified by initial setup optimization 308 in step 504. Using this information, the number of outbound load points for each inbound movable platform 204 can be determined in step 506. For example, an inbound movable platform 204 may have parcels or pallets which need to be transferred to three different destinations and would require at least two additional movable platforms 204 (i.e., because the inbound movable platform 204 is reused as an outbound movable platform once it has been unloaded/reloaded).

Next, for each inbound movable platform 204, the initial setup optimization determines which parcels or pallets need to be handled in step 508. For example, if the majority of pieces on a movable platform are intended for the same facility 100, only a few select pieces need to be removed/loaded onto the movable platform 204 until it is ready to be loaded onto a waiting trailer. This can significantly speed up the loading/loading process over the conventional LIFO process. If additional movable platforms 204 are needed, the initial setup optimization 308 adds additional platform movements to the instructions.

Based upon a plurality of criteria (weight, number of parcels, number of inbound/outbound movable platforms 204, number of pieces to be handled), the initial setup optimization 308 determines an optimized space 206 for each movable platform 204 on dock 202 in step 512. The initial setup optimization 308 also determines the number of workers required to complete all necessary moves in step 514. This step avoids having too many or too few workers located on dock 102.

Based upon the number of assigned workers (step 514) and the number of pieces to be handled (step 508), the initial setup optimization 308 determines all piece level moves for the workers (the parcel and pallet move instructions) in step 518. The instructions are then stored in instructions database 310 in step 518. Step 512-518 are repeated daily for each set of input data 302 that is received by cross-dock management system 200.

Figure 6:
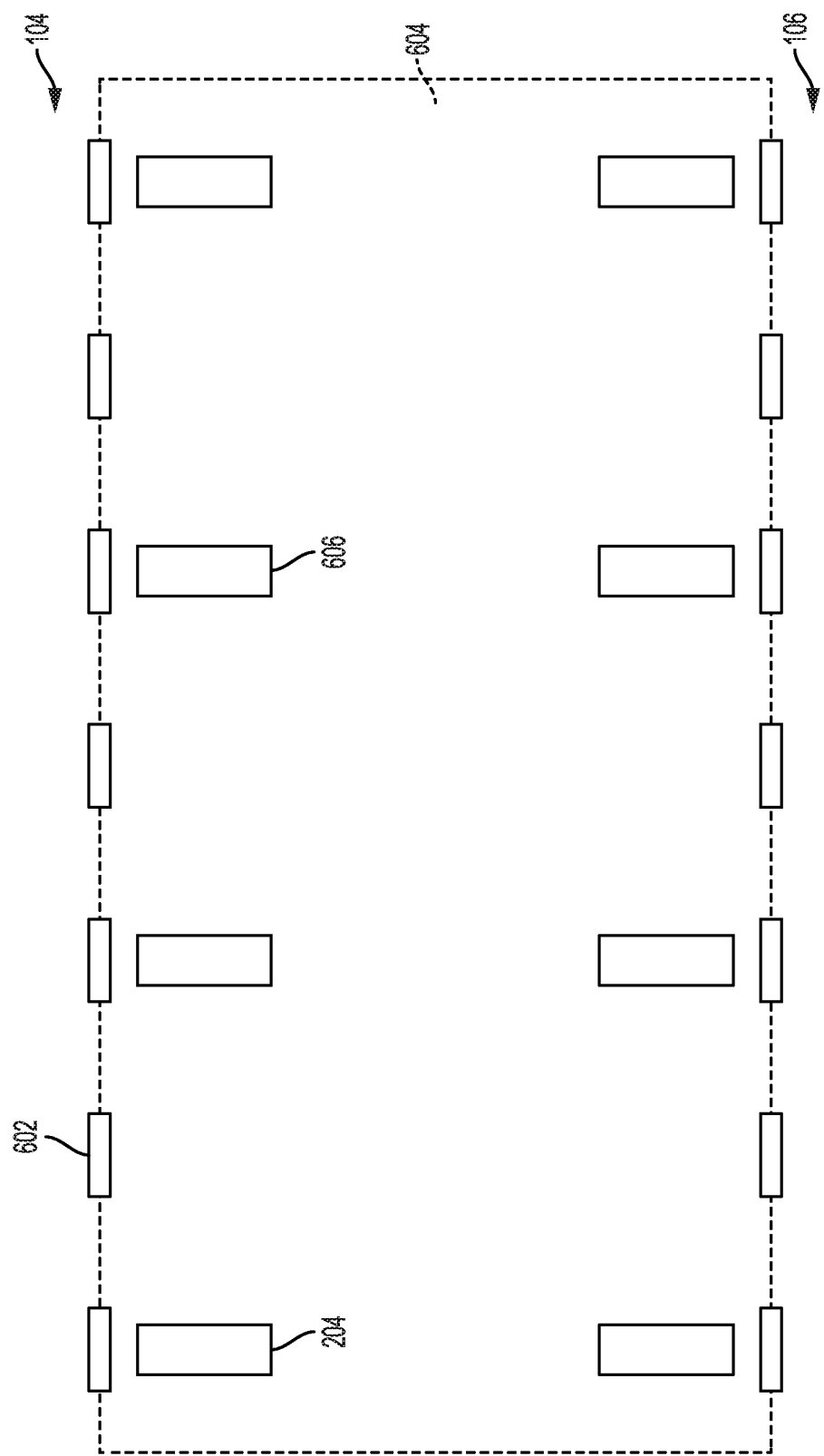
FIG. 6 depicts the dock of FIG. 1 configured to be used with movable platforms.

FIG. 6 depicts terminal 100 of FIG. 1 adapted for use with movable pallets 204. In some instances, it may not be feasible for an LTL shipper to modify the layout of dock 102. However, dock 102 can be made to be compatible with movable platforms 204 using the dock configuration shown in FIG. 6. As shown, movable platforms 204 are placed at every other door 602 to allow access to three sides of movable platform 204 both on the inbound doors 104 and outbound doors 106. This creates a central aisle which allows for easy movement of movable platforms 204 and parcels 606. It should be apparent to one of ordinary skill in the art that initial setup optimization 308 and real time instruction algorithms 322 can be adapted to work with the dock configuration shown in FIG. 6.

Figure 7:
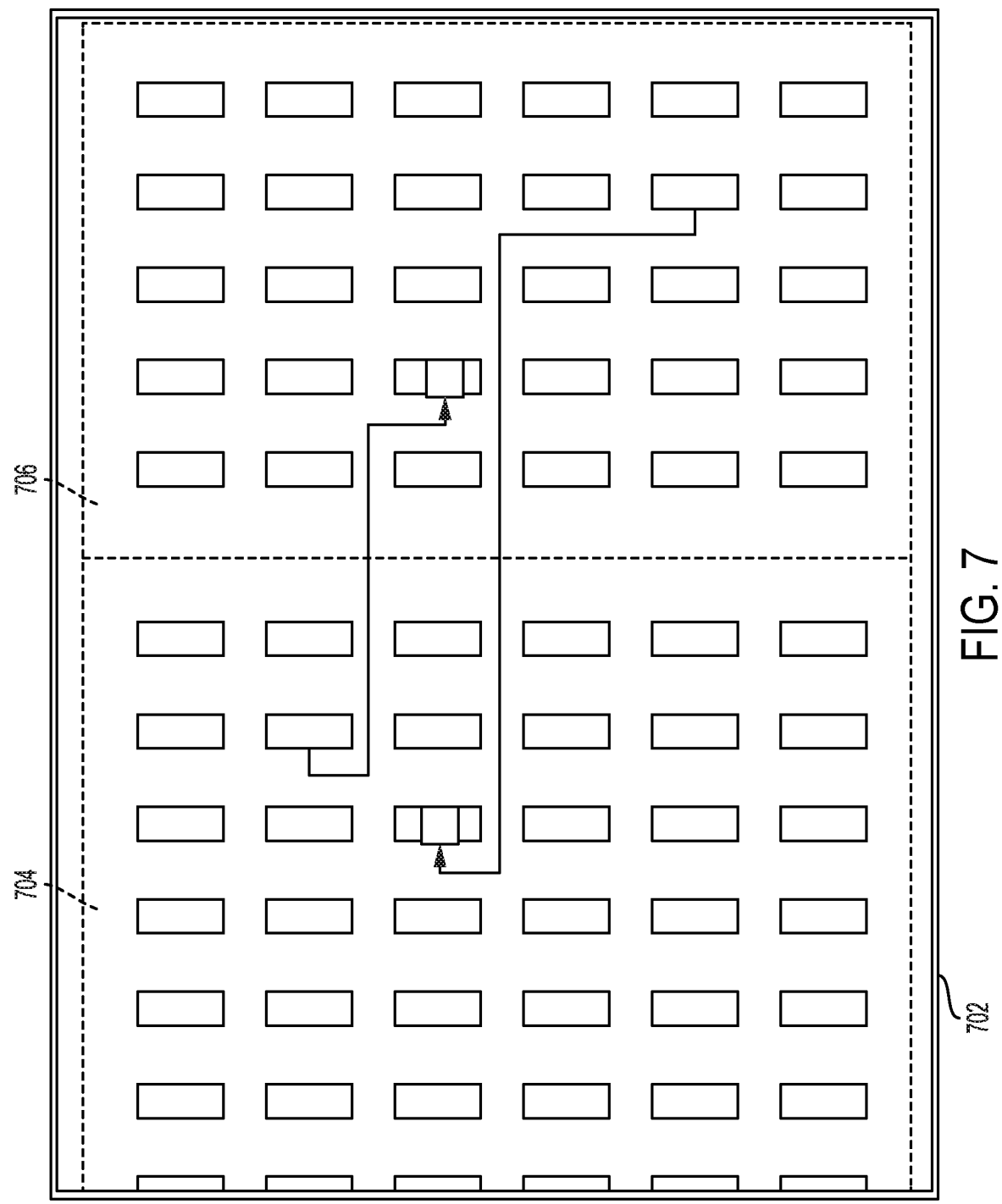
FIG. 7 depicts a shared optimized dock in accordance with the present invention.

FIG. 7 depicts a shared dock 702 which is share between independent carriers located in the same geographical region that have a partnership for the purposes of sharing data. In such cases, predictive analytics can optimize loads by combining partner carrier freight (e.g., shipment parcels) onto the same movable platform 204, further reducing truck schedules and cost. As shown, a first side 704 of dock 702 is occupied by a first carrier and a second side 706 of dock 702 is occupied by a second carrier. First side 704 and second side 706 may be split equally or according to the terms of a partnership agreement. Movable platforms 204 and RFID tags can be made available from the first side 704 to the second side 706, and vice versa. However, each side 704 and 706 is preferably controlled by its own cross-dock management system 200 to provide data confidentiality. The two cross-dock management systems 200 may be linked in order to share limited data. As an example, the cross-dock management system 200 associated with first side 704 may determine that it is more economically feasible to have the second side 706 deliver certain parcels. The second side 706 may agree or disagree to each request from first side 704.

Figure 8:
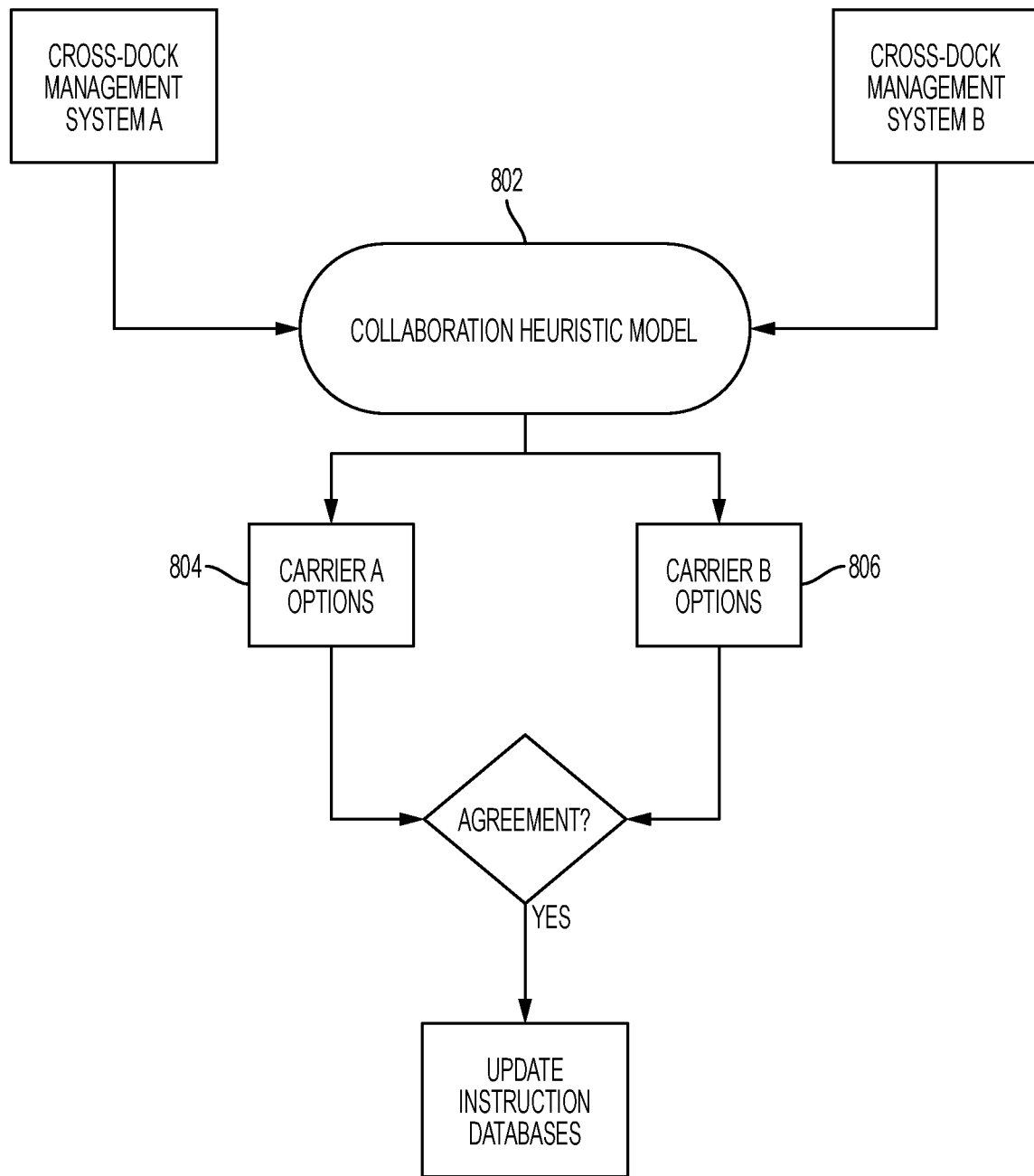
FIG. 8 depicts a flowchart showing the steps used when two or more shippers share the same optimized dock.

FIG. 8 depicts a flowchart showing the collaboration between two cross-dock management systems which share dock 702. The cross-dock management system associated with first side 704 is cross-dock management system A and the cross-dock management system associated with first side 706 is cross-dock management system B. Cross-dock management systems A and B each feed collaboration data into collaboration heuristic model 802. Collaboration data may include information such as the number of available spaces on movable platforms 204, the destinations of all movable platforms 204, manifest data about any overflow parcel (i.e., a parcel which would require an extra shipment or does not fit within available movable platforms 204), etc. The collaboration heuristic model 802 compares the collaboration data from cross-dock management systems A and B and determines options 804 for carrier A and options 806 for carrier B. Carrier A and Carrier B can agree/disagree to each option or cross-dock management systems A and B may be programmed to automatically accept/deny certain options in step 808. Any options that agreed upon will be updated in the instructions database 310 as computed by real time instruction algorithms 322.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A cross-dock management system comprising:
   a cross-dock having a plurality of separated spaces;
   a plurality of doors for receiving inbound trailers and outbound trailers;
   a plurality of movable platforms arranged on the cross-dock in the separated spaces;
   a plurality of cargo arranged on at least one of the movable platforms,
   wherein the movable platforms and the spaces are assigned at least one unique identifier;
   at least one conveyance vehicle for moving the cargo or the movable platforms,
   wherein the at least one conveyance vehicle comprises a reader for reading the unique identifiers; and
   an initial setup optimization server for determining a plurality of ordered move instructions for moving the cargo using the at least one conveyance vehicle.

2. The cross-dock management system according to claim 1, further comprising:
   at least one dimensioner for a) monitoring the piecewise loading and unloading of cargo onto each movable platform and b) verifying that each movable platform does not exceed a predefined size limit.

3. The cross-dock management system according to claim 2, further comprising:

a real-time instruction server, wherein if it is determined that the predefined size limited has been exceeded for a movable platform, the real-time instruction server calculates one or more corrected move instructions and transmits the one or more corrected move instructions to the at least one conveyance vehicle.

4. The cross-dock management system according to claim 1, further comprising;
an RFID array,
wherein the RFID array verifies that the ordered move instructions have been performed properly.

5. The cross-dock management system according to claim 1, wherein the reader is used to verify that ordered move instructions assigned to the at least one conveyance vehicle are performed correctly.

6. The cross-dock management system according to claim 5, further comprising:
a real-time instruction server for calculating, in real time, new moves if it is determined that one of the ordered move instructions has been performed incorrectly.

7. The cross-dock management system according to claim 6, wherein the conveyance vehicle is automated.

8. The cross-dock management system according to claim 1, wherein the unique identifiers are barcode labels.

9. The cross-dock management system according to claim 1, wherein the unique identifiers are RFID tags.

10. The cross-dock management system accord to claim 1, wherein at least one of the separated spaces includes a scale utilized for determining an upper weight limit for each movable platform.

11. The cross-dock management system accord to claim 1, wherein at least one of the separated spaces includes a pressure sensing device for determining if cargo placed on a movable platform is evenly distributed.

12. The cross-dock management system according to claim 1, wherein the ordered movie instructions minimize empty carries by the at least one conveyance vehicle.

13. The cross-dock management system according to claim 1, wherein the plurality of separated spaces are arranged in a grid pattern.

14. A cross-dock collaboration system comprising:
a first cross-dock management system;
a second cross-dock management system,
wherein the first cross-dock management system and the second cross-dock management system are utilized on the same cross-dock; and
a heuristic collaboration server for determining collaboration options between the first cross-dock management system and the second cross-dock management system by:

a. receiving first collaboration data from the first cross-dock management system;
b. receiving second collaboration data from the second cross-dock management system;
c. comparing the first collaboration data with the second collaboration data to determine the collaboration options;
d. for all accepted collaboration options, determining ordered move instructions for
transferring first overflow cargo from first movable platforms assigned to the first cross-dock management system to second movable platforms assigned to the second cross-dock management system; and
transferring second overflow cargo from the second movable platforms to the first movable platforms; and
e. performing the ordered move instructions using one or more conveyance vehicles.

15. The cross-dock collaboration system according to claim 14, wherein the first collaboration data includes a number of open spaces on the first movable platforms and the second collaboration data includes a number of open spaces on the second movable platforms.

16. The cross-dock collaboration system according to claim 15, wherein the first collaboration data further includes manifest data about cargo located on the first movable platforms and the second collaboration data further includes manifest data about cargo located on the second movable platforms.

17. The cross-dock collaboration system according to claim 14, wherein the heuristic collaboration server comprises:
a first module for allowing the first cross-dock management system to accept or reject the collaboration options; and
a second module for allowing the second cross-dock management system to accept or rejected the collaboration option,
wherein step d. is performed only for collaboration options approved using the first module an the second module.

18. The cross-dock collaboration system according to claim 17, wherein the first module and the second module automatically accept a subset of the collaboration options based upon predefined rules.

* * * * *